United States Patent [19]

Weston et al.

[11] Patent Number: 5,352,265
[45] Date of Patent: Oct. 4, 1994

[54] GRANULAR UREA-BASED FERTILIZER

[75] Inventors: Charles W. Weston, Prairieville, La.; Lawrence A. Peacock, Mundelein, Ill.; Willis L. Thornsberry, Jr., Gretna, La.; Allen R. Sutton, Corydon, Ky.

[73] Assignee: Freeport-McMoRan Resource Partners, Limited Partnership, New Orleans, La.

[21] Appl. No.: 151,553

[22] Filed: Nov. 12, 1993

[51] Int. Cl.$^5$ .............................................. C05C 9/00
[52] U.S. Cl. ........................................ 71/29; 71/30; 71/902; 71/64.03
[58] Field of Search ................... 71/29, 30, 902, 64.03

[56] References Cited

U.S. PATENT DOCUMENTS

| | | | |
|---|---|---|---|
| 3,576,613 | 4/1971 | Fleming | 71/28 |
| 3,877,415 | 4/1975 | Blouin | 118/303 |
| 3,903,333 | 9/1975 | Shirley, Jr. et al. | 427/212 |
| 3,991,225 | 11/1976 | Blouin | 427/3 |
| 4,081,264 | 3/1978 | Ali | 71/28 |
| 4,517,003 | 5/1985 | Kolc et al. | 71/28 |
| 4,517,004 | 5/1985 | Swerdloff et al. | 71/28 |
| 4,530,714 | 7/1985 | Kolc et al. | 71/28 |
| 4,932,992 | 6/1990 | Radel | 71/29 |
| 4,954,156 | 9/1990 | Gautney et al. | 71/28 |
| 4,994,100 | 2/1991 | Sutton et al. | 71/30 |

OTHER PUBLICATIONS

Clay et al, Soil Sci Soc. Am. J, 54, pp. 263-266, 1990 "Ammonia Volatilization from Urea . . . Hydrolysis Inhibitørs".

Primary Examiner—Ferris H. Lander
Attorney, Agent, or Firm—Fisher, Christen & Sabol

[57] ABSTRACT

An improved homogenous granular fertilizer composition is disclosed; the composition is comprised primarily of urea, N-(n-butyl)thiophosphoric triamide (NBPT), and dicyandiamide (DCD). The composition of this invention can be applied to a field crop in a single surface application and will nevertheless supply sufficient nitrogen to the plants throughout their growth and maturing cycles. The new improved composition increases the nitrogen uptake by plants, enhances crop yields, and minimizes the loss of both ammonium nitrogen and nitrate nitrogen from the soil.

The NBPT is incorporated into the homogenous granular fertilizer composition of this invention by blending a concentrated solution of NBPT in a solvent selected from the group consisting of liquid amides, 2-pyrrolidone, and N-alkyl 2-pyrrolidones directly into molten urea prior to its granulation; the DCD may be added to the urea melt as a solid or in dissolved form along with the NBPT.

23 Claims, No Drawings

GRANULAR UREA-BASED FERTILIZER

FIELD OF THE INVENTION

This invention relates to an improved granular urea-based fertilizer composition. More specifically, this invention discloses a three-component fertilizer composition comprising urea, N-(n-butyl)thiophosphoric triamide (NBPT), and dicyandiamide (DCD). The granular fertilizer composition can be applied to a field crop in a single application and will nevertheless supply sufficient nitrogen to the plants throughout their growth and maturing cycles. As a result, the improved composition increases the nitrogen uptake efficiency of plants, enhances crop yields, and minimizes the loss of fertilizer-derived nitrogen. The NBPT may be incorporated into the improved granular fertilizer formulation by blending solid NBPT or a concentrated solution of NBPT in a solvent selected from the group consisting of liquid amides, 2-pyrrolidone, and N-alkyl 2-pyrrolidones, directly with molten urea prior to granulation, in which case a four-component composition results. The DCD may be added to the urea melt as a solid, a suspension, or in dissolved form along with the NBPT. Of course, the compositions of this invention can contain other additional ingredients, as desired.

BACKGROUND OF THE INVENTION

Nitrogen is an important plant nutrient. In addition to phosphorous, potassium, and other nutrients, nitrogen is needed to support the growth and development of plant life. Some plants, such as legumes, through a symbiotic relationship with Rhizobium bacteria take up elemental nitrogen from the atmosphere and fix this nitrogen into the soil. However, most plants grown to produce human and animal food require the use of nitrogen fertilizer in order to sustain their agricultural production.

The most widely used and agriculturally important high-analysis nitrogen fertilizer is granular urea, $CO(NH_2)_2$. About 60 million tons per year of urea are produced world-wide and used on a variety of crops, such as corn, wheat and rice. When applied to moist soil, the urea becomes a source of ammonia as a result of hydrolysis catalyzed by urease, an enzyme produced by numerous fungi and bacteria. The reaction may be written as follows:

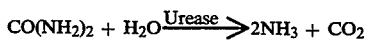

$$CO(NH_2)_2 + H_2O \xrightarrow{Urease} 2NH_3 + CO_2$$

The ammonia formed as shown above undergoes very rapid hydrolysis to form ammonium ions in accordance with the following equilibrium:

$$NH_3 + H_2O \rightleftharpoons NH_4^+ + OH^-$$

In most soils, the ammonium formed through the hydrolysis of urea is readily converted to nitrate via a sequence of bacterial oxidation reactions; the overall oxidation reaction may be written as follows:

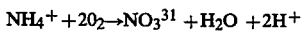

$$NH_4^+ + 2O_2 \rightarrow NO_3^{31} + H_2O + 2H^+$$

and is commonly referred to as "nitrification".

Both, the ammonium nitrogen derived through the hydrolysis of urea as well as the nitrate nitrogen derived through the oxidation of ammonium may be assimilated directly by the plant. Thus, the urease-catalyzed hydrolysis of urea and the bacterial oxidation of ammonium are two key steps in the vital transformation of urea nitrogen first into ammonium nitrogen and then into nitrate nitrogen, both of which function in soils as nitrogen nutrients.

The major problems associated with the use of urea as a source of these nitrogen nutrients to support the growth of crop plants relate to the fact that the time frame for the catalytic hydrolysis of urea to ammonia and for the subsequent nitrification of ammonium does not coincide with the ongoing demand for nitrogen by the root system of the plants. More specifically, the catalytic hydrolysis of urea and the subsequent nitrification of the ammonium ions proceed relatively rapidly, i.e. within 2 to 20 days, as compared to the 50 to 200 day growing seasons for typical crop plants. Since both ammonia and nitrate can be lost from the soil by various mechanisms before being assimilated by the plant, the premature conversion of urea into ammonium and nitrate nitrogen contributes to the low (40%) efficiency with which crop plants utilize fertilizer nitrogen. Examples of mechanisms by which nitrogen can be lost from the soil include loss of ammonia through volatilization to the atmosphere and loss of nitrate through leaching to the subsoil by rainwater and/or through denitrification, i.e. bacterial conversion of nitrate to elemental nitrogen. Another drawback related to rapid hydrolysis of urea is the potential for excessive accumulation of ammonia in the soil shortly after seeding which may damage germinating seedlings and young plants.

Prior art offers three approaches to make nutrient nitrogen derived from urea-containing granular fertilizers available to root systems of plants throughout their growing season: (1) multiple fertilizer applications, (2) the use of controlled release fertilizers, and (3) the incorporation of urease inhibitors or nitrification inhibitors into the fertilizer formulation. There are certain limitations and disadvantages associated with each of these approaches advocated by prior art.

The first approach involves the use of multiple fertilizer applications during the course of a crop growth season. Such multiple fertilizer applications can provide adequate nitrogen to meet the demand of growing plants, but they do so at the expense of higher fertilizer costs, higher fertilizer application costs, and of the adverse environmental impact associated with the loss of nitrate through leaching to the subsoil.

The second approach to extending the availability of nutrient nitrogen to crop plants over a longer period of time involves the use of controlled release granular fertilizers. The patent literature provides numerous references to prior art methodology for the production of controlled release urea-containing fertilizers. Thus, U.S. Pat. No. 3,295,950 discloses a method of producing sulfur-coated nitrogen fertilizer pellets having a controlled fertilizer dissolution rate. The process comprises applying a coating of sulfur to fertilizer pellets and subsequently top-coating the resultant particles with an oily sealant to impregnate any cracks and voids in said sulfur coating. As a result, a sulfur shell is formed which is nearly impervious to water and suitable for regulating the dissolution rate of the nitrogen fertilizer, and thereby extending its availability to the plants.

U.S. Pat. Nos. 3,576,613; 3,903,333; and 4,081,264 disclose improved processes for sulfur encapsulation of nitrogen fertilizers to provide controlled fertilizer dissolution rates. The '613 patent provides a method for reducing the amount of sulfur needed to attain a coating which is impervious to rain water and which releases nutrients at a rate selected to match the demands of the growing plants. The improvement offered by the '333 patent centers on applying a precisely uniform coating of sulfur onto substrate particles of urea. The process is designed to ensure that the substrate consists of smooth, round granular particles and that each granule is covered by a plurality of sequentially applied streams of fluid (molten) sulfur to form a multitude of thin concentric layers of sulfur coating upon the urea substrate. Finally, the '264 patent discloses a process for preparing a slow release nitrogen fertilizer in which the sulfur coating is impregnated with bitumen and then coated with a mineral powder to produce free flowing particles. In all three cases the desired product is a slow release nitrogen fertilizer, i.e. a material in which the sulfur coating serves to control the release of the substrate to the soil over an extended period of time. U.S. Pat. Nos. 3,877,415 and 3,991,225 disclose equipment suitable for applying a uniform coating of sulfur to urea and thereby imparting slow release characteristics to the coated urea fertilizer. While sulfur-coated urea (SCU) is an article of commerce, its use is very limited. This is a reflection of SCU's premium price and of its lower nitrogen content, as compared to granular urea.

The third approach toward improving the availability of nitrogen to the root system of plants over an extended period of time entails the incorporation of a urease inhibitor or of a nitrification inhibitor into granular urea-containing fertilizers. Urease inhibitors are compounds capable of inhibiting the catalytic activity of the urease enzyme upon urea in moist soil. Among the most effective urease inhibitors are the phosphoric triamide compounds disclosed in U.S. Pat. No. 4,530,714. An example of an effective urease inhibitor disclosed in the '714 patent is N-(n-butyl)thiophosphoric triamide, which will be referred to herein as NBPT. When incorporated into a urea-containing fertilizer, NBPT reduces the rate at which urea is hydrolyzed in the soil to ammonia. The benefits realized as a result of the delayed urea hydrolysis include the following: (1) nutrient nitrogen is available to the plant over a longer period of time, (2) excessive build up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While NBPT does not directly influence the rate of ammonium nitrification, it does control the levels of ammonium which are subject to the nitrification process and thereby indirectly controls the levels of nitrate nitrogen in the soil.

NBPT has not been commercially used heretofore as an additive in granular urea, presumably because of the lack of a suitable method for the preparation of such urea-based granular fertilizers stemming from certain physical and chemical characteristics of industrial grade NBPT which render this material difficult to handle. Industrial grade NBPT is a waxy, sticky, heat-sensitive and water-sensitive material. Consequently, the material is susceptible to decomposition during storage and methodology for metering NBPT into continuous production equipment has been heretofore unavailable.

Another potential drawback associated with the use of NBPT as a urease inhibitor for granular urea-containing fertilizers is believed to be related to the low ammonium to nitrate ratios which are likely to be observed in soil systems treated with such fertilizers.

The availability of nitrate nitrogen to plants over an extended period of time can also be enhanced through the incorporation of nitrification inhibitors into urea-containing fertilizers. Nitrification inhibitors are compounds capable of inhibiting the bacterial oxidation of ammonium to nitrate in the soil. Among the most effective nitrification inhibitors is dicyandiamide, also referred to as DCD. A granular urea-containing fertilizer formulation containing DCD is disclosed in U.S. Pat. No. 4,994,100. While DCD does not affect the rate at which urea is hydrolyzed to ammonia in the soil, it significantly reduces the rate at which ammonium is oxidized to nitrate. The benefits realized as a result of the delayed nitrification process include the following: (1) nutrient nitrogen is available to the plant over a longer period of time than is the case in the absence of DCD, (2) the potential for loss of nitrate nitrogen through denitrification and/or leaching is reduced, (3) plant uptake of nitrogen is increased, and (4) crop yields are increased. However, the improvement in the performance of DCD-containing granular urea fertilizers attributed to the incorporation of DCD in these formulations is believed to be severely limited by the susceptibility of these formulations to urease-catalyzed hydrolysis following application of the fertilizer to the soil. This may result in relatively high ammonia losses through volatilization and/or in ammonia damage to seedlings and young plants.

In addition to the foregoing, U.S. Pat. Nos. 4,517,003; 4,517,004; 4,932,992; and 4,954,156 make reference to various compounds which are capable of inhibiting both the urease-catalyzed hydrolysis of urea and the oxidation of ammonium to nitrogen. None of these, however, have found commercial acceptance in the fertilizer industry as additives capable of improving the performance of urea-based granular fertilizers in terms of their ability to enhance crop yields.

Accordingly, it is an object of this invention to provide a granular urea-containing fertilizer formulation which offers an effective alternative to the high amounts of urea-containing nitrogen fertilizer that are currently used to assure that crop yields are not limited by the availability of nitrogen as a plant nutrient.

It is a further object of this invention to increase nitrogen uptake efficiency of urea-containing granular fertilizers without the need for applying a substantially impervious sulfur coating to such fertilizers.

It is another object of this invention to provide a urea-based granular fertilizer formulation the performance of which is characterized by relatively low ammonia volatilization losses, low losses of nitrate nitrogen through denitrification and/or leaching, and substantially enhanced crop yields.

It is still another object of this invention to provide a method for the production of the urea-containing granular fertilizer formulations disclosed hereinbelow.

SUMMARY OF THE INVENTION

The improved homogenous granular fertilizer composition of this invention is comprised primarily of urea, N-(n-butyl)thiophosphoric triamide (NBPT), and dicyandiamide (DCD). The urea content of the composition of this invention is between about 90% and about 99% by weight, the NBPT content of the composition is between about 0.02% and about 0.5% by weight, and the DCD accounts for up to about 1.2% by weight of the composition. The composition also contains some moisture, urea synthesis byproducts, and may contain an NBPT solvent belonging to the group consisting of liquid amides, 2-pyrrolidone, and N-alkyl 2-pyrrolidones, and may optionally contain other additives, such as a herbicide, a dye, an NBPT stabilizer, or a micronutrient.

The homogenous granular fertilizer composition of this invention can be applied to a field crop in a single surface application and will nevertheless supply sufficient nitrogen to the plants throughout their growth and maturing cycles. The new improved composition increases the nitrogen uptake by plants, enhances crop yields, and minimizes the loss of both ammonium nitrogen and nitrate nitrogen from the soil.

The NBPT may be incorporated into the homogenous granular fertilizer composition of this invention by blending a concentrated solution of NBPT in a solvent selected from the group consisting of liquid amides having the formula $R_1CONR_2R_3$, wherein $R_1$ is a hydrogen atom or an alkyl group having 1 to 4 carbon atoms and wherein $R_2$ and $R_3$ are independently hydrogen atoms, alkyl groups having 1 to 4 carbon atoms, or phenyl groups, 2-pyrrolidone, and N-alkyl 2-pyrrolidones, wherein the alkyl group ranges in size from one to twelve carbon atoms, directly into molten urea prior to its granulation. The DCD may be added to the urea melt as a solid or in dissolved form along with the NBPT.

It is understood that the term "liquid amide" as used in this specification refers to amides which are liquid at ambient pressure and temperature of about 760 mm Hg and about 25° C., respectively. The group of solvents defined in the preceding sentence will be referred to hereinbelow as "the NBPT solvents of this invention" or simply as "solvents of this invention". The NBPT solvents of this invention are used in amounts of 20 to 70 wt. %, preferably 25 to 50 wt. %, of the NBPT.

DETAILED DESCRIPTION OF THE INVENTION

The present invention provides an improved homogenous granular urea-based fertilizer composition containing two additives, namely a urease inhibitor which stabilizes the urea against urease-catalyzed hydrolysis to ammonium and a nitrification inhibitor which stabilizes the ammonium against oxidation to the nitrate form. Specifically, the improved granular fertilizer composition of this invention is comprised primarily of urea, N-(n-butyl) thiophosphoric triamide (NBPT), and dicyandiamide (DCD).

NBPT is the most effective known urease inhibitor and has the following chemical formula:

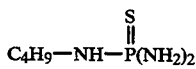

It should be understood that the term NBPT as used throughout this specification refers not only to N-(n-butyl)thiophosphoric triamide in its pure form, but also to industrial grades of the material which may contain up to 50% impurities, depending on the method of synthesis and purification scheme(s), if any, employed in the production of the NBPT.

DCD is among the most effective known nitrification inhibitors, or ammonia stabilizers, and has the following chemical formula:

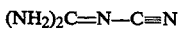

The urea content of the composition of this invention is between about 90% and about 99% by weight, and preferably between about 92% and about 99% by weight; the NBPT content of the composition is between about 0.02% and about 0.5% by weight, and preferably between about 0.04% and about 0.4% by weight; and the DCD accounts for about 0.01% to about 1.2% by weight of the composition, and preferably accounts for between about 0.05% and about 1.1% by weight of the composition. The composition may also contain some moisture, urea synthesis byproducts, and an NBPT solvent of this invention, and may optionally contain other additives, such as a herbicide, a dye, an NBPT stabilizer, or a micronutrient. The size of the granules of the improved homogenous urea-based fertilizer composition of this invention ranges from about 0.5 millimeters to about 10 millimeters, and preferably from about 0.84 millimeters to about 4.76 millimeters.

Those skilled in the art would expect that the incorporation of both NBPT and DCD into urea could impair the effectiveness of the urea as a fertilizer. Since NBPT is the most effective agent known to inhibit the urease-catalyzed conversion of urea to ammonia, it would have been expected that the additional incorporation of DCD into urea could result in a formulation which does not provide adequate nitrate nitrogen to support vigorous plant growth. The inventors surprisingly found that the combined incorporation of these two additives into urea results in a fertilizer composition which promotes exceptionally high crop yields.

The homogenous granular urea-based fertilizer composition of this invention can be used in all agricultural applications in which granular urea is currently used. These applications include a very wide range of crop and turf species, tillage systems, and fertilizer placement methods. Most notably, the fertilizer composition of this invention can be applied to a field crop, such as corn or wheat, in a single surface application and will nevertheless supply sufficient nitrogen to the plants throughout their growth and maturing cycles. The fertilizer composition of this invention is capable of supplying the nitrogen nutrient with greater efficiency than any previously known fertilizer composition. The new improved composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which urea is currently used for a given application, with the expectation of a higher crop yield in the case of the composition of this invention. Alternately, the composition of this invention may be applied to the soil at lower rates than is the case for urea and still provide comparable crop yields, but with a much lower potential for nitrogen loss to the environment. It is of interest to illustrate the quantities of NBPT and DCD introduced into the soil when a given composition of this invention is applied as a fertilizer. For example, assuming that the composition is applied to the soil at a rate of 100 pounds per acre and that it contains 0.1% NBPT and 1% DCD, it can be readily calculated that the rates of NBPT and DCD application are 0.1 and 1.0 pounds per acre, respectively.

The utilization of two specific additives, one to inhibit the urease-catalyzed hydrolysis of urea and the other to inhibit the nitrification of ammonia, in the fertilizer composition of this invention offers an opportunity to tailor the make-up of the composition to match the nitrogen nutrient demand of a given crop/soil/weather scenario. For example, if conditions are such that the opportunity for ammonia losses through volatilization to the atmosphere is thereby diminished, the level of the NBPT urease inhibitor incorporated into the formulation may be reduced, within the specified range, without also changing the level of the DCD nitrification inhibitor. The relative resistance of the homogenous fertilizer composition of this invention to urea hydrolysis and ammonia oxidation is controlled by properly selecting the NBPT to DCD weight ratio of the composition. This ratio should exceed a value of about 0.02, should preferably be between about 0.02 and about 10.0, and should most preferably be between about 0.04 and about 4.0. Homogenous fertilizer compositions with NBPT to DCD weight ratios near the higher end of these ranges will exhibit relatively higher resistance to urea hydrolysis than to ammonium oxidation, and vice versa. This independent control over the relative resistance of the composition to urea hydrolysis and ammonia oxidation is unattainable through the methods of prior art and provides unparalleled flexibility in meeting the nutrient demands of various crops under a broad range of soil/weather conditions.

In accordance with the present invention, the NBPT is incorporated into the homogenous urea-based fertilizer composition by blending a concentrated solution of NBPT in a solvent of this invention directly with molten urea at a temperature of about 266° F. to about 275° F. prior to the granulation or prilling of the urea in a conventional urea production facility. Sufficient mixing is employed during this blending step to assure that the NBPT solution is homogeneously distributed throughout the molten urea before the melt cools and solidifies in the subsequent granulation step.

As already stated, industrial grade NBPT is a waxy and sticky material, and as such it is difficult to handle in conventional industrial metering equipment so as to introduce it into a process stream at a predetermined rate. Furthermore, NBPT is poorly soluble in water, in aqueous solutions, such as ammonium hydroxide solutions, and in numerous organic solvents, such as toluene, benzene, hexane, dichloromethane, and others. NBPT also exhibits poor stability in certain solvents, notably in water and in aqueous solutions. It has now been discovered, however, that NBPT is exceptionally soluble in liquid amide solvents for the NBPT. Such solvents include liquid amides having the formula $R_1CONR_2R_3$, wherein $R_1$ is a hydrogen atom or an alkyl group having 1 to 4 carbon atoms and wherein $R_2$ and $R_3$ are independently hydrogen atoms, alkyl groups having 1 to 4 carbon atoms, or phenyl groups, 2-pyrrolidone, and N-alkyl 2-pyrrolidones wherein the alkyl group ranges in size from one to twelve carbon atoms, and that concentrated solutions of NBPT in the solvents of this invention are relatively stable. These solutions can be stored over extended periods of time and can be introduced into molten urea using conventional metering pumps.

Examples of liquid amides used in the practice of this invention include formamide, N,N-dimethyl formamide, N,N-dimethyl acetamide, and N-butyl N-phenyl acetamide. The N-alkyl 2-pyrrolidones used as NBPT solvents in accordance with this invention are five-membered heterocyclic organic compounds with one nitrogen atom per ring, with an oxygen atom bonded to a ring carbon atom adjacent to the nitrogen, and with an alkyl group ranging in size from one to twelve carbon atoms bonded directly to the nitrogen atom. Examples of N-alkyl 2-pyrrolidones which can be used as NBPT solvents in practicing this invention include N-methyl 2-pyrrolidone, N-octyl 2-pyrrolidone, and N-dodecyl 2-pyrrolidone. The preferred solvent used in the practice of this invention is N-methyl 2-pyrrolidone.

The concentrated NBPT solution used in producing the homogenous urea-based fertilizer composition of this invention may contain between about 30% and 80% NBPT by weight, and preferably between about 50% and about 75% NBPT by weight. The concentrated NBPT solutions of this invention may be prepared by dissolving NBPT in a solvent of this invention, as will be illustrated in Example 1 hereinbelow, or by incorporating the solvent of this invention into the NBPT production system in order to produce an NBPT solution, rather than recover a waxy NBPT solid. NBPT solutions in solvents of this invention remain stable over extended periods of time and over temperatures ranging from about 30° F. to about 120° F. Thus, the concentrated NBPT solutions of this invention can be managed using conventional liquid storage, transportation, and pumping equipment. The amount of concentrated NBPT solution added to molten urea in accordance with this invention depends on the desired NBPT content of the granular fertilizer composition and on the NBPT content of the concentrated NBPT solution, and can be readily calculated by those skilled in the art.

Because of the concentrated nature of the NBPT solution only very limited quantities of a solvent of this invention are introduced into the urea along with the NBPT. For example, if the NBPT content of the concentrated NBPT solution used to incorporate the NBPT in the fertilizer composition is 70% and the NBPT content of the resulting fertilizer composition is 0.07%, the solvent content of the resulting fertilizer composition is only 0.03%. The NBPT solvents of this invention have boiling points above about 150° C. and in many cases above about 200° C. i.e., well above the temperature of the molten urea to which the concentrated NBPT solution is added. Thus, most of the solvent introduced into the urea melt along with the NBPT is expected to remain in the urea composition.

In accordance with the present invention, in addition to the NBPT, DCD is also added to and blended with the molten urea prior to its granulation. Several methods can be used for the introduction of DCD into the molten urea: if available as a powder or in granular form, the DCD can be fed into a stream of molten urea using a conventional solids feeding device; preferably, the DCD may be dissolved in a relatively small quantity of molten urea, as for example in a side stream of molten urea in a urea plant, to form a concentrated DCD solution in molten urea which is then metered into the main stream of the molten urea; finally, the DCD may be incorporated into the concentrated NBPT solution described hereinabove and introduced into the molten urea along with the NBPT. Regardless of the method selected to introduce the DCD into the molten urea, sufficient mixing should be provided to facilitate homogenous distribution of the DCD throughout the urea melt. The homogeneous distribution of both NBPT and DCD in the granular fertilizer compositions of this invention enhances the performance of these compositions in terms of their ability to promote plant growth.

The order in which NBPT and DCD are added to the molten urea in the practice of this invention is flexible: either NBPT or DCD may be introduced first, or both of these components may be added simultaneously. Preferably, the DCD is added first to provide adequate time for both the dissolution and uniform distribution of the DCD in the molten urea prior to the granulation step. A convenient point for the addition of DCD to molten urea in a urea production plant would be before or between the evaporation steps used to reduce the water content of the molten urea. The concentrated NBPT solution, however, is preferably introduced into the molten urea just prior to the granulation or prilling step with only sufficient retention time in the melt to allow for uniform distribution of the NBPT in the melt. Preferably, the retention time of the melt between the point of NBPT addition and the granulation step is less than 5 minutes, and most preferably less than 1 minute. Longer retention times may result in partial thermal decomposition of the NBPT and in reduced effectiveness of the fertilizer composition.

After both DCD and NBPT are introduced into the urea melt, the molten composition is sprayed into a granulation apparatus, such as a fluidized bed granulator, a tubular granule forming apparatus, or a spray prilling apparatus. Preferably, a tubular granule forming apparatus is used, wherein the spray continually coats and solidifies upon the fertilizer particles as they move from one end of the tubular apparatus to the other end. The granules exiting the apparatus are sized. In the preferred embodiment of the invention, granules which pass through a 4 mesh Tyler Series sieve (about 4.76 millimeters) and stay on a 20 mesh Tyler Series sieve (about 0.84 millimeters) are retained as product. The undersized particles are cooled and recycled and the oversized particles are cooled, ground and then recycled to the granule forming apparatus.

The granular fertilizer composition of this invention offers a number of advantages over prior art. First and foremost, crop yields attained through the use of the new fertilizer compositions exceed crop yields attainable with any other known granular urea-based fertilizer composition. Furthermore, this invention provides unparalleled flexibility in tailoring the composition of the granular fertilizer formulation to the needs of the crop/soil/weather scenario of a given application. Consequently, the granular fertilizer compositions of this invention facilitate maximum crop yields without over-fertilization and associated nitrogen losses.

It should be borne in mind that NBPT and DCD are generally regarded as urease and nitrification inhibitors, respectively. However, when used in accordance with this invention they do not completely inhibit, but merely suppress over an extended period of time the susceptibility of the compositions of this invention to catalytic hydrolysis by enzymes and the propensity of the ammonia that does form to promote excessive bacterial growth.

In addition to the foregoing, this invention also provides a simple, convenient and effective method of producing the new granular fertilizer compositions.

EXAMPLES

Example 1

This example describes the preparation of a concentrated solution of NBPT in N-methyl 2-pyrrolidone. 300 grams of N-methyl 2-pyrrolidone were placed in a 1500 ml glass beaker. 700 grams of industrial grade NBPT were slowly added to the N-methyl 2pyrrolidone over a period of 30 minutes with stirring to assure effective dissolution of the NBPT. The industrial grade NBPT was an unrefined product containing 80% NBPT. Thus, the NBPT solution prepared in this manner contained 56% NBPT. The solution was stored at a temperature of about 70° F. over a period of three months, during which time it was sampled and analyzed on a monthly basis. The NBPT assays of the solution remained virtually unchanged during this period of time. This example illustrates not only the exceptionally high solubility of NBPT in the solvents of this invention, but also the long term stability of concentrated NBPT solutions in these solvents.

Example 2

This example illustrates the method of this invention for the incorporation of NBPT into a homogenous urea-based granular fertilizer composition. As a first step, a 50,000 lb batch of concentrated NBPT solution was prepared by dissolving 35,000 lbs of industrial grade NBPT in 15,000 lbs of N-methyl 2-pyrrolidone. The industrial grade NBPT contained 80% NBPT. Thus, the concentrated NBPT solution contained 56% NBPT. This concentrated NBPT solution was pumped at a rate equivalent to 4 pounds of NBPT per 1996 pounds of urea into a 34 ton/hour stream of molten urea passing through a pipe leading from the last stage of urea evaporation directly to the urea granulation apparatus in a urea production facility. The temperature of the molten urea at the point at which the NBPT solution was injected was about 275° F. Although the retention time of the urea stream between the point at which the concentrated NBPT solution was injected and the urea granulation apparatus was only in the order of 20 seconds, the degree of turbulence in the stream of molten urea assured thorough mixing and homogenous distribution of the concentrated NBPT solution in the molten urea. The urea production facility was operated in this mode for a period of about 8.5 days, during which time about 6960 tons of urea containing 0.2% NBPT was produced. The NBPT was uniformly distributed through each granule of the product.

Example 3

This example describes a plant test illustrating the method for the production of the improved granular urea-based fertilizer composition of this invention. The test was conducted in an industrial facility with a urea production rate of 34 tons per hour. DCD was introduced into the molten urea at a rate of 20 pounds of DCD per 1976 pounds of urea before the last stage of evaporation, that is at a point in the continuous urea production scheme where the molten urea has a moisture content of about 4% to 6%. Thorough mixing was provided to assure homogenous distribution of the DCD in the urea melt. The DCD-containing molten urea was next passed through the last evaporator to reduce its moisture content to about 1%. A concentrated solution of NBPT in N-methyl 2-pyrrolidone prepared as described in Example 2 hereinabove was next pumped into the DCD-containing molten urea stream a rate equivalent to 4 pounds of NBPT per 1996 pounds of DCD-containing molten urea. At the point where the concentrated NBPT solution was injected, the DCD-containing molten urea stream had a temperature of about 275° F. The resulting stream of NBPT- and DCD-containing molten urea was next directed through a pipe leading directly to the granulation apparatus in a urea production facility. Although the retention time of the NBPT- and DCD-containing molten urea stream between the point at which the concentrated NBPT solution was injected and the urea granulation apparatus was only in the order of 20 seconds, the degree of turbulence in the stream of the molten urea composition assured thorough mixing and homogenous distribution of the concentrated NBPT solution in the DCD-containing molten urea.

Example 4

This example describes a field test in which the yield of corn and the ear leaf nitrogen content of corn was measured from test plots that were grown under identical conditions using broadcast fertilization by urea, urea with 0.23% NBPT, and urea with 0.26% NBPT and 0.92% DCD at a N rate of 150 lbs. N/Acre as well as a check plot without the addition of urea to ascertain corn response to nitrogen fertilization under these various conditions. The atmospheric conditions during this test were four rain free days after planting and fertilization followed by a 0.6 inch rainfall. These conditions are ideal for nitrogen loss by both ammonia volatilization as a result of the rain free days after application and the relatively heavy rain that followed after four days that would be conducive to nitrogen losses by leaching. The data; reported both as crop yield results and as ear leaf nitrogen concentration illustrate the benefits of having the presence of both the urease inhibitor and the nitrification inhibitor to address the loss of nitrogen values by both major routes of nitrogen loss.

TABLE I

Effect of NBPT and NBPT-DCD on Corn Yield and Nitrogen Ear Leaf Concentration

| Treatment (150 Lbs. N/acre) | Corn Yield (Bu./Acre) | Ear Leaf Nitrogen Concentration (PPM) |
| --- | --- | --- |
| Urea | 129 | 2.9 |
| Urea-NBPT | 142 | 3.1 |
| Urea-NBPT-DCD | 149 | 3.6 |
| Check | 101 | 1.8 |

What is claimed is:

1. A homogenous granular fertilizer composition comprising as components urea, N-(n-butyl) thiophosphoric triamide, and dicyandiamide, wherein said urea is present in an amount between about 90% and about 99% by weight, said N-(n-butyl) thiophosphoric triamide is present in an amount between about 0.02% and about 0.5% by weight, and said dicyandiamide is present in an amount of about 0.01% to about 1.2% by weight.

2. A homogenous fertilizer composition as claimed in claim 1 wherein said urea is present in an amount between about 90% and 99% by weight, said N-(n-butyl)-thiophosphoric triamide is present in an amount between about 0.04% and 0.4% by weight, and said dicyandiamide is present in an amount between about 0.05% and about 1.1% by weight.

3. A homogenous fertilizer composition as claimed in claim 1 wherein the weight ratio of said N-(n-butyl)thiophosphoric triamide to said dicyandiamide is above about 0.02.

4. A homogenous fertilizer composition as claimed in claim 1 wherein the weight ratio of said N-(n-butyl)thiophosphoric triamide to said dicyandiamide is between about 0.02 and about 10.0.

5. A homogenous fertilizer composition as claimed in claim 1 wherein the weight ratio of said N-(n-butyl)thiophosphoric triamide to said dicyandiamide is between about 0.04 and about 4.0.

6. A homogenous fertilizer composition as claimed in claim 1 wherein said composition has been formed into granules from a melt of said components.

7. A homogenous fertilizer composition as claimed in claim 1 wherein the particle size of said composition ranges from about 0.84 to about 4.76 millimeters.

8. Homogeneous granular fertilizer composition as claimed in claim 1 containing a liquid amide.

9. Homogeneous granular fertilizer composition as claimed in claim 8 wherein said liquid amide is present in the amount of about 20% to about 70% by weight of said N-(n-butyl)thiophosphoric triamide, in said composition.

10. Homogeneous granular fertilizer composition as claimed in claim 8 wherein said liquid amide is present in the amount of about 25% to about 50% by weight of said N-(n-butyl)thiophosphoric triamide, in said composition.

11. Homogeneous granular fertilizer composition as claimed in claim 1 containing a liquid amide selected from the group consisting of liquid amides having the formula $R_1CONR_2R_3$, wherein $R_1$ is a hydrogen atom or an alkyl group having 1 to 4 carbon atoms and wherein $R_2$ and $R_3$ are independently hydrogen atoms, alkyl groups having 1 to 4 carbon atoms, or phenyl groups; 2-pyrrolidone; and N-alkyl 2-pyrrolidones, wherein the alkyl group ranges in size from one to twelve carbon atoms.

12. A method of enhancing the growth of plants by applying to the soil a homogeneous granular fertilizer composition comprising as components urea, N-(n-butyl) thiophosphoric triamide, and dicyandiamide, wherein said urea is present in an amount between about 90% and about 99% by weight, said N-(n-butyl) thiophosphoric triamide is present in an amount between about 0.02% and about 0.5% by weight, and said dicyandiamide is present in an amount of about 0.01% to about 1.2% by weight.

13. A method of enhancing the growth of plants as claimed in claim 12 wherein said urea is present in said composition in an amount between about 90% and about 99% by weight, said N-(n-butyl)thiophosphoric triamide is present in said composition in an amount between about 0.04% and about 0.4% by weight, and said dicyandiamide is present in said composition in an amount between about 0.05% and about 1.1% by weight.

14. A method of enhancing the growth of plants as claimed in claim 12 wherein the weight ratio of said N-(n-butyl)thiophosphoric triamide to said dicyandiamide in said composition is above about 0.02.

15. A method of enhancing the growth of plants as claimed in claim 12 wherein the weight ratio of said N-(n-butyl)thiophosphoric triamide to said dicyandiamide in said composition is between about 0.02 and about 10.0.

16. A method of enhancing the growth of plants as claimed in claim 12 wherein the weight ratio of said N-(n-butyl)thiophosphoric triamide to said dicyandiamide in said composition is between about 0.04 and about 4.0.

17. A method for producing a homogeneous granular fertilizer composition comprising providing urea in molten condition and adding dicyandiamide an da concentrated solution of N-(n-butyl) thiophosphoric triamide in a solvent selected from the group consisting of liquid amides having the formula $R_1CONR_2R_3$, wherein $R_1$ is a hydrogen atom or an alkyl group having 1 to 4 carbon atoms and wherein $R_2$ and $R_3$ are independently hydrogen atoms, alkyl groups or phenyl groups, 2-pyrrolidone, and N-alkyl 2-pyrrolidones wherein the alkyl group ranges in size from one to twelve carbon atoms, and b) forming said molten urea from step (a) containing dicyandiamide and N-(n-butyl)thiophosphoric triamide dissolved therein into granules, wherein said urea is present in an amount between about 90% and about 99% by weight, said N-(n-butyl) thiophosphoric triamide is present in an amount between about 0.02% and about 0.5% by weight, and said dicyandiamide is present in an amount of about 0.01% to about 1.2% by weight.

18. A method as claimed in claim 17 wherein urea is present in said composition in amount between about 90% and about 99% by weight, N-(n-butyl)thiophosphoric triamide is present in said composition in amount between about 0.04% and about 0.4% by weight, and dicyandiamide is present in said composition in an amount between about 0.05% and about 1.1% by weight.

19. A method as claimed in claim 17 wherein the weight ratio of N-(n-butyl)thiophosphoric triamide to dicyandiamide in said composition is above about 0.02.

20. A method as claimed in claim 17 wherein the weight ratio of N-(n-butyl)thiophosphoric triamide to dicyandiamide in said composition is between about 0.02 and about 10.0.

21. A method as claimed in claim 17 wherein the weight ratio of N-(n-butyl)thiophosphoric triamide to dicyandiamide in said composition is between about 0.04 and about 4.0.

22. A method as claimed in claim 17 wherein the size of said granules ranges from about 0.84 to about 4.76 millimeters.

23. A method as claimed in claim 17 wherein said dicyandiamide is added to said urea before said concentrated solution of N-(n-butyl)thiophosphoric triamide is added to said urea.

* * * * *